(12) United States Patent
Karns (10) Patent No.: US 10,962,286 B2
(45) Date of Patent: Mar. 30, 2021

(54) MOUNTING HARDWARE FOR REFRACTORY MODULE

(71) Applicant: HARBISONWALKER INTERNATIONAL, INC., Moon Township, PA (US)

(72) Inventor: Stephen Karns, Mars, PA (US)

(73) Assignee: HARBISONWALKER INTERNATIONAL, INC., Moon Township, PA (US)

( * ) Notice: Subject to any disclaimer, the term of this patent is extended or adjusted under 35 U.S.C. 154(b) by 209 days.

(21) Appl. No.: 16/119,199

(22) Filed: Aug. 31, 2018

(65) Prior Publication Data

US 2020/0072553 A1 Mar. 5, 2020

(51) Int. Cl.
| | |
|---|---|
| *A47F 5/00* | (2006.01) |
| *F27D 1/00* | (2006.01) |
| *F16B 9/02* | (2006.01) |
| *F16B 13/04* | (2006.01) |
| *F16M 13/02* | (2006.01) |

(52) U.S. Cl.
CPC ............... *F27D 1/004* (2013.01); *F16B 9/02* (2013.01); *F16B 13/04* (2013.01); *F16M 13/02* (2013.01)

(58) Field of Classification Search
CPC . F27D 1/004; F16B 13/04; F16B 9/02; F16M 13/02
USPC ........... 248/300; 428/223; 52/745.21, 747.13
See application file for complete search history.

(56) References Cited

U.S. PATENT DOCUMENTS

| | | | |
|---|---|---|---|
| 2,256,961 | A | 9/1941 | Pearson et al. |
| 2,365,629 | A | 12/1944 | Eckel |
| 2,389,965 | A | 11/1945 | Eckel |
| 3,019,864 | A | 2/1962 | Lester |
| 3,378,975 | A | 4/1968 | Hill |
| 3,436,883 | A | 4/1969 | Charman, Jr. et al. |
| 3,742,670 | A | 7/1973 | Byrd, Jr. |

(Continued)

FOREIGN PATENT DOCUMENTS

| | | |
|---|---|---|
| CA | 203270 A1 | 2/1992 |
| FR | 2525753 A3 | 10/1983 |
| WO | WO 80/00162 | 2/1980 |

OTHER PUBLICATIONS

International Search Report and Written Opinion from corresponding International Patent Application No. PCT/US2019/044584, dated Oct. 30, 2019.

*Primary Examiner* — Todd M Epps
(74) *Attorney, Agent, or Firm* — Kusner & Jaffe (57) ABSTRACT

Mounting hardware for mounting an insulation module on a furnace wall. The hardware comprises a mounting bracket embedded within the module. The bracket has a plurality of flexible tabs, each tab having a fixed end and a free end. The free ends of the tabs are arranged about a central point and are movable (flexible) relative to the fixed ends. A mounting stud is provided having a fixed end attachable to an inner surface of a furnace wall and a free end. The stud extends from the inner surface, and the stud has an annular groove adjacent the fixed end. The stud is dimensioned to extend through the mounting bracket between the free ends of the tabs and to cause the tabs to flex as the bracket moves along the stud from the free end towards the fixed end, wherein the tabs snap and lock into the annular groove when the bracket reaches the annular groove.

18 Claims, 10 Drawing Sheets

(56) References Cited

U.S. PATENT DOCUMENTS

| | | | |
|---|---|---|---|
| 4,018,023 A | | 4/1977 | Anderson |
| 4,030,261 A | * | 6/1977 | Coleman .................. F27D 1/144 |
| | | | 52/511 |
| 4,056,904 A | | 11/1977 | Dawdy |
| 4,139,975 A | * | 2/1979 | Baker ....................... F16B 5/00 |
| | | | 411/520 |
| 4,157,001 A | | 6/1979 | Pickles |
| 4,248,023 A | | 2/1981 | Dunlap |
| 4,381,634 A | | 5/1983 | Hounsel et al. |
| 4,429,504 A | | 2/1984 | Hounsel et al. |
| 4,597,702 A | | 7/1986 | Brown |
| 4,803,822 A | | 2/1989 | Deren |
| 4,842,465 A | * | 6/1989 | Pease .................... E04B 1/7629 |
| | | | 24/595.1 |
| 4,848,055 A | | 7/1989 | Wade |
| 4,925,350 A | * | 5/1990 | Kolseth ................ B29C 70/745 |
| | | | 411/520 |
| 5,010,706 A | | 4/1991 | Sauder |
| 5,059,369 A | | 10/1991 | Schiferl |
| 6,782,669 B1 | | 8/2004 | Dixon |
| 8,309,212 B2 | * | 11/2012 | Vandura .................. F23M 5/02 |
| | | | 428/223 |

\* cited by examiner

MOUNTING HARDWARE FOR REFRACTORY MODULE

FIELD OF INVENTION

The present invention relates generally to refractory linings for high temperature furnace applications, and more particularly, to mounting hardware for mounting insulation modules onto a furnace wall and a method of mounting the same.

BACKGROUND OF THE INVENTION

It is known to use refractory ceramic mats or blankets made from fibrous refractory materials to line the interior of high temperature furnaces. The refractory fiber blankets are often assembled into cube-shaped "modules" that are formed from a plurality of individual layers of a refractory ceramic fiber blanket. U.S. Pat. Nos. 4,001,996, 5,353,567 and 3,819,468 disclose different types of "modules" formed from layers of refractory materials. The layers of refractory material are held together in a number of different ways. For example, U.S. Pat. No. 5,353,567 to KNIGHT et al. discloses layers of refractory material held together by bands that are wrapped around the layers of refractory material. L-shaped members are located at the corners of the module to prevent the bands from compressing or distorting the refractory layers. U.S. Pat. No. 3,819,468 to SAUDER et al. discloses a module having multiple refractory layers that are held together by metal wires extending through the refractory layers. U.S. Pat. No. 8,309,212 to VENDURA et al. discloses holding layers of refractory material together by plastic fasteners.

Each of the foregoing systems maintains the refractory module in a generally cubic configuration for post manufacturing handling, shipping and mounting to a furnace wall.

It is known to mount the cubic modules to the inner surface of a furnace in a number of different ways. Typically, mounting structures are embedded within a module to facilitate mounting the module to the furnace wall. One method of mounting a refractory module to a furnace wall is by means of spikes mounted to inner surface of the furnace wall. With this type of mounting, the refractory module does not require a mounting structure within the module. A module is simply forced onto the spikes which hold the module in place. While such a mounting method is relatively simple, such mounting is unreliable for extended service life of the refractory module.

A second method of mounting a refractory module involves a threaded stud on the inner surface of the furnace wall. The module is bolted onto the threaded stud using a conventional nut fastener. The refractory module is guided by a guide rod onto the threaded studs. The nut is then guided over the guide rod onto the threaded stud. A special hollow socket wrench is required to screw the nut onto the stud and secure the refractory module. However, if the threaded stud becomes damaged during assembly or installation (i.e., the threads on the rod become damaged), the threaded rod must be replaced. In some such instances, some operators require heat treating of the weld that attaches the rod to the furnace wall. Such heat treating cannot be performed with modules in place within the furnace. Consequently, replacing threaded rods on a furnace wall once installation has begun requires removal of all modules. As will be appreciated, such work is both time consuming and expensive.

A third method of installing a refractory module is by a quick-weld method. This method is similar to the aforementioned stud-weld design assembly and includes a yoke or channel with beams that hold the folds of the refractory module in place. The yoke or channel is attached to a quick-weld anchor system in which the tip of a metal rod, having a flux embedded within it, and an insulating ceramic protrude out the back of the module to make contact with the shell of the vessel. An electrical current is sent through the metal rod and produces an arc on the back of the module that welds the anchor system in the module to the shell. After a short period of time, the module is secured to the shell with a nut threaded onto the rod.

While this "quick-weld system" is the fastest method of installing modules, it does have deficiencies. Foremost, the quick-weld anchor assembly can sometimes be faulty and not form a weld at all. In such situation, entire modules must be discarded. In addition, while the module may initially feel secured, it may not be adequately welded to the furnace wall which could lead to premature failure during service. As a result of this potential problem, many industries, specifically the refinery and petrochemical industries, require that anchor welds must be quality checked with bend tests. This testing cannot be conducted on quick-weld modules, which means only the stud-weld variety is acceptable for these industries.

The present invention overcomes these and other problems and provides a quick and effective method of mounting a refractory module to a furnace wall.

SUMMARY OF THE INVENTION

In accordance with one aspect of the present invention, there is provided a mounting hardware for mounting an insulation module on a furnace wall. The hardware comprises a mounting bracket embedded within the module. The bracket has a plurality of flexible tabs, each tab having a fixed end and a free end. The free ends of the tabs are arranged about a central point and are movable (flexible) relative to the fixed ends. A mounting stud is provided having a fixed end attachable to an inner surface of a furnace wall and a free end. The stud extends from the inner surface, and the stud has an annular groove adjacent the fixed end. The stud is dimensioned to extend through the mounting bracket between the free ends of the tabs and to cause the tabs to flex as the bracket moves along the stud from the free end towards the fixed end, wherein the tabs snap and lock into the annular groove when the bracket reaches the annular groove.

In accordance with another aspect of the present invention, mounting hardware for mounting an insulation module on a furnace is provided. The hardware is comprised of a mounting bracket within said module, said bracket having a plurality of flexible tabs, each tab having a fixed end and a free end, said free ends of said tabs arranged about a central point and being movable relative to said fixed ends, and a mounting stud having a fixed end attachable to an inner surface of a furnace wall and a free end, wherein said stud extends from said inner surface, said stud having an annular groove between said fixed end and said free end, said stud being dimensioned to extend through said mounting bracket between said free ends of said tabs and to cause said tabs to flex as said bracket moves along said stud from said free end towards said fixed end, wherein said tabs snap and lock into said annular groove when said bracket reaches said annular groove.

An advantage of the present invention is hardware for mounting an insulation module on a furnace wall, which hardware is quick and easy to use.

Another advantage of the present invention as described above, is hardware for mounting an insulation module on a furnace wall, wherein the hardware is disposed away from the hot face of the insulation module.

A still further advantage of the present invention as described above, is hardware for mounting an insulation module on a furnace wall, wherein said insulation module snaps and locks into position against the furnace wall.

DETAILED DESCRIPTION OF THE INVENTION

Figure 1:
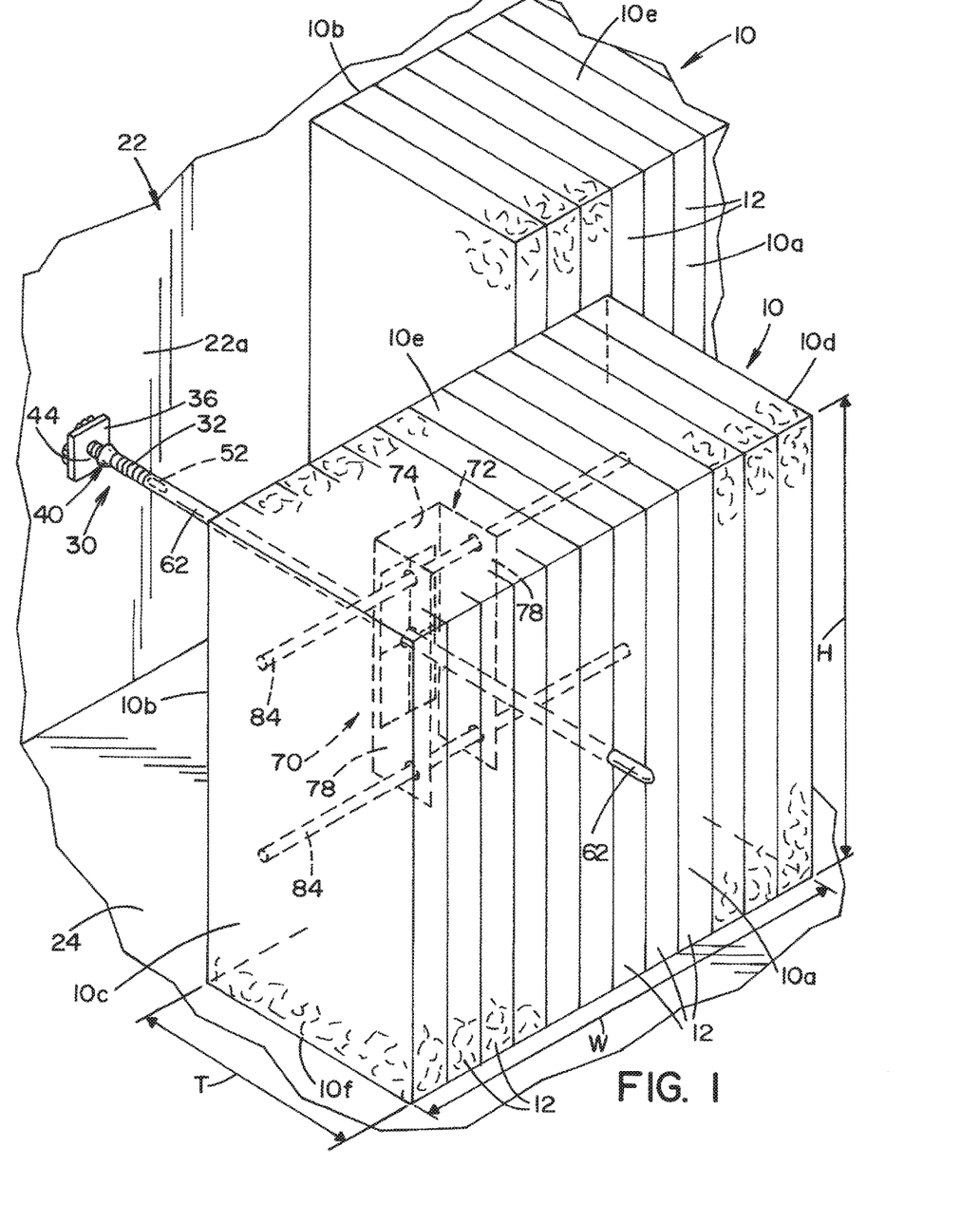
FIG. 1 is a perspective view illustrating a method of mounting a refractory module to an inner surface of a furnace wall according the present invention.

Referring now to the drawings wherein the showings are for the purpose of illustrating a preferred embodiments of the invention only, and not for the purposes of limiting the same, FIG. 1 shows a refractory fiber module 10 being installed on the inner surface 22a, of a furnace side wall 22. Module 10 is comprised of a plurality of like-shaped layers 12 of refractory material blanket. The assembled layers 12 form a refractory module 10 that has cubic shape. The means for maintaining the refractory layers 12 in the cubic shape are not shown. One method of maintaining the cubic refractory module 10 in a cubic shape is disclosed in U.S. Pat. No. 8,309,212. The disclosure is expressly incorporated by reference. In FIG. 1, a first layer of modules 10 is shown being installed on a furnace bottom wall 24.

Each module 10 has a hot face 10a for presentation to an interior of a furnace and a cold face 10b for presentation to a surface of a furnace wall. A module thickness "T" is defined between hot face 10a and cold face 10b. Opposing side faces 10c, 10d define between them a module width "W." A top face 10e and a bottom face 10f define between them a module height "H."

Figure 2:
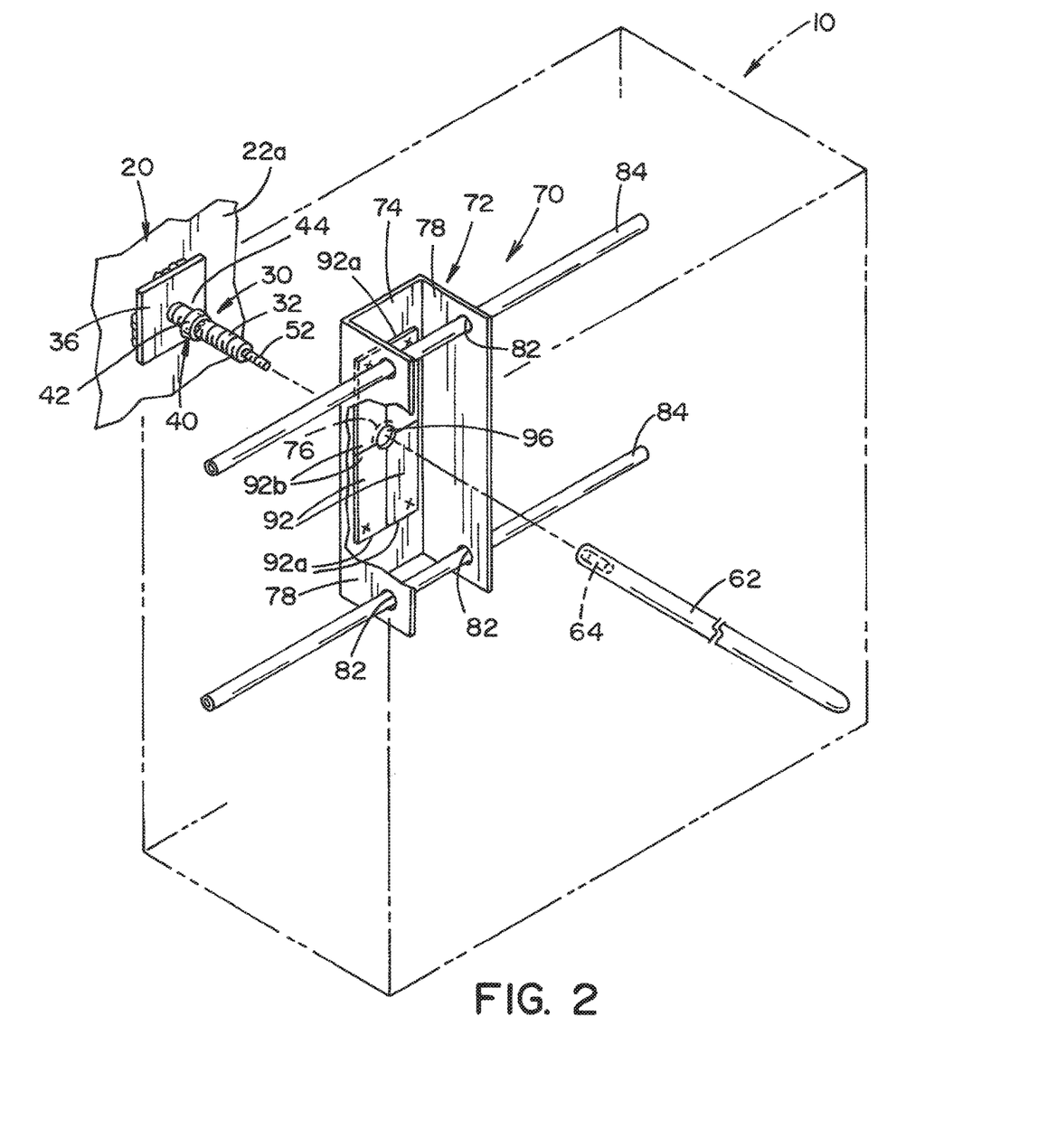
FIG. 2 is a perspective view of mounting hardware for mounting a refractory module to an inner surface of a furnace wall illustrating one embodiment of the present invention.

In accordance with the present invention, refractory fiber module 10 is mounted to inner surface 22a of furnace wall 22 by mounting hardware, best seen in FIG. 2. The mounting hardware is basically comprised of stud assembly 30 and bracket assembly 70.

Stud assembly 30 is basically comprised of an elongated stud 32 dimensioned to be attached to inner surface 22a of furnace wall 22 and to extend from wall 22. In this respect, stud 32 has a fixed end 32a attached to furnace wall 22 and a free end 32b.

According to one aspect of the present invention, an outer surface of stud 32 expands outwardly in a direction from free end 32b toward fixed end 32a. In the embodiment shown in FIGS. 1-7, stud 32 includes a conical surface 42 that expands in an axial direction from free end 32b toward fixed end 32a. Stud 32 includes an annular groove 44 between fixed end 32a and free end 32b of stud 32. In the embodiment shown, annular slot or groove 44 is defined between conical surface 42 and fixed end 32a of stud 32, as best seen in FIG. 4.

In the embodiment shown, stud 32 is a threaded metallic rod that is mounted, i.e., welded, to a base plate 36. In the embodiment shown, base plate 36 is rectangular in shape and is welded to inner surface 22a of furnace wall 22. Conical surface 42 is defined by a metallic conical nut 40 that is threaded onto stud 32 and attached thereto by welding or brazing. Annular groove 44, adjacent to the fixed end of the stud, is defined between the base plate 36 and an enlarged end of a conical nut 40. As shown in the drawings, conical surface 42 faces free end 32ba of a stud 32.

Stud 32 includes a threaded extension 52. As shown in the drawings, extension 52 has a smaller diameter than the diameter of stud 32. Threaded extension 52 is axially aligned with stud 32 and is dimensioned to matingly engage with a guide rod 62 (shown in FIG. 1), as shall be described in greater detail below.

Figure 3:
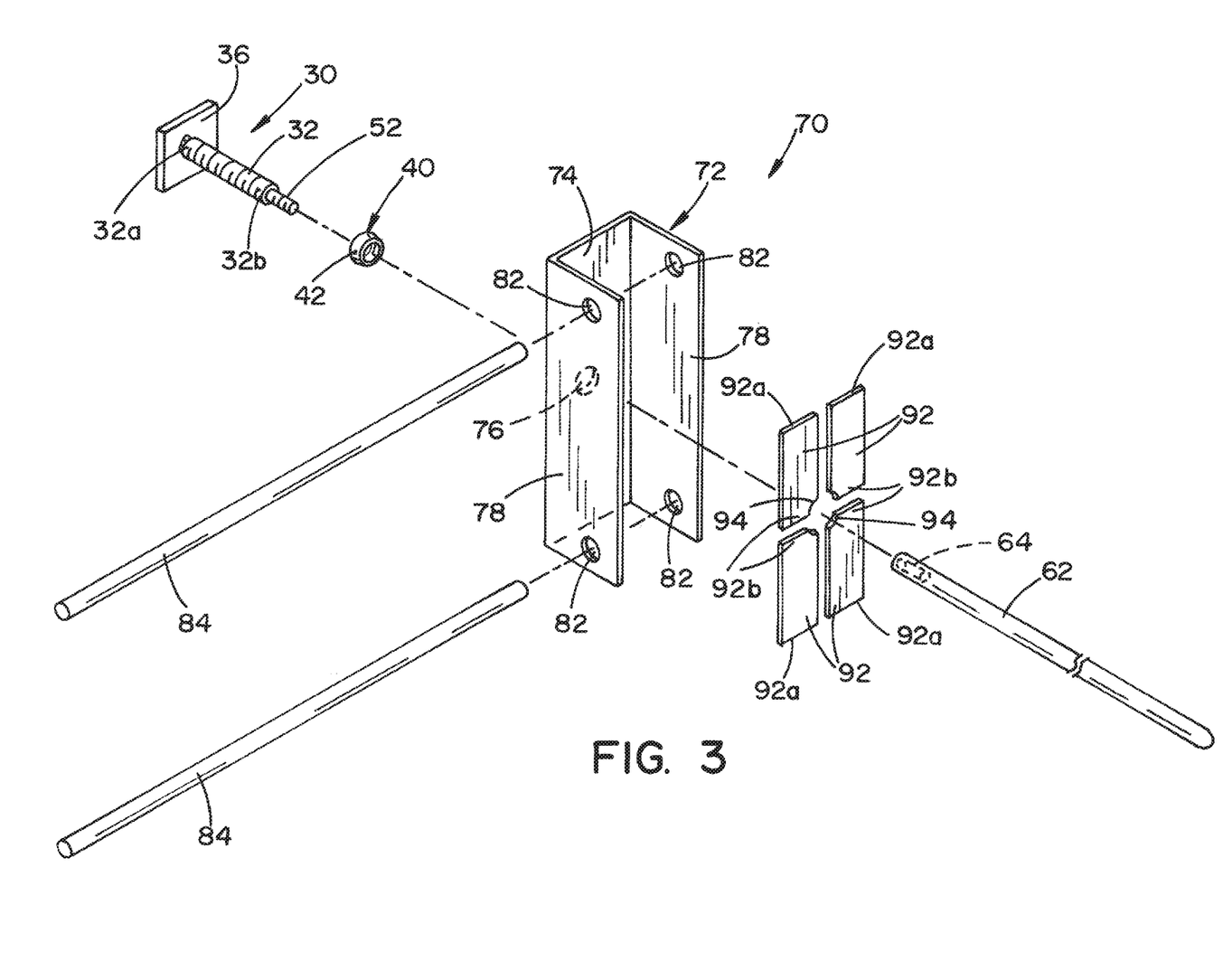
FIG. 3 is an exploded view of the mounting hardware shown in FIG. 2.
Figure 4:
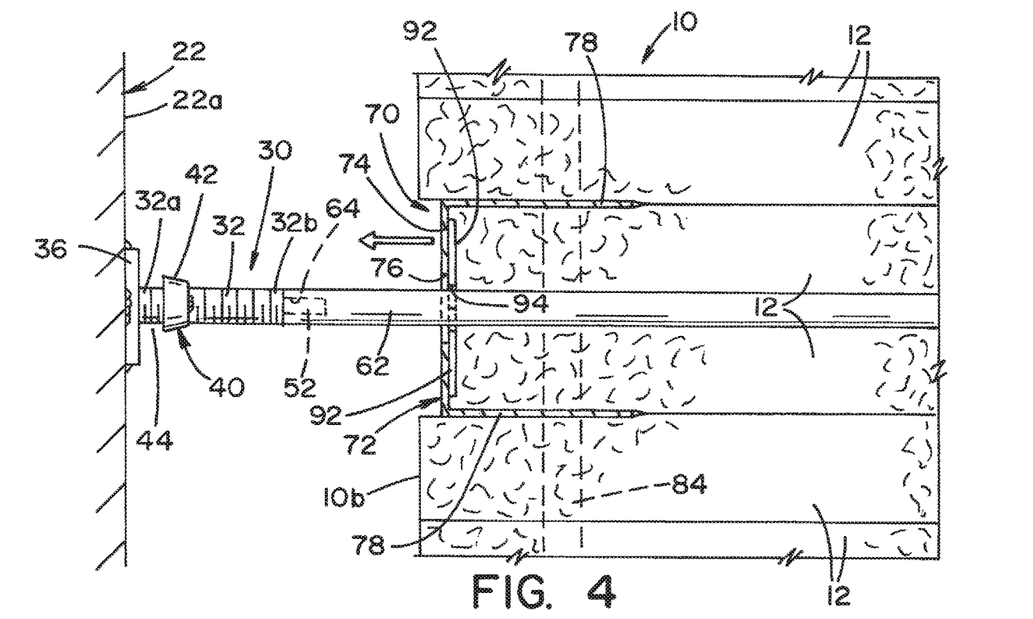
FIG. 4 is a top sectional view showing a refractory module (partially shown) being mounted onto a mounting stud on a furnace wall using a guide rod.

Referring now to FIGS. 2 and 3, bracket assembly 70 is best seen. Bracket assembly 70 is basically comprised of a mounting plate 74 having a plurality of flexible fingers or tabs 92 that are arranged about a central opening 76 in mounting plate 74. Opening 76 is dimensioned to receive mounting stud 32 and conical nut 40 therein.

In the embodiment shown in FIGS. 1-9, mounting plate 74 is part of a U-shaped bracket 72 having spaced apart side walls 78 that extend to one side of mounting plate 74, as best seen in FIG. 3. A pair of spaced apart holes 82 is formed in each of side walls 78. Holes 82 in side walls 78 are aligned and dimensioned to receive two elongated beams or support rods 84 that extend through side walls 78 and through layers 12 of the fibrous refractory material, as illustrated in FIG. 1. In FIG. 1, mounting bracket 72 and support rods 84 are shown in phantom. In the embodiment shown in FIGS. 1-9, side walls 78 are parallel to each other and spaced apart so as to receive multiple layers 12 of the refractory material therebetween. As shown in the drawings, two layers 12 of refractory material received between side walls 78 of U-shaped bracket 72.

In the embodiment shown, flexible fingers or tabs 92 are comprised of rectangular, metallic strips that are arranged in a rectangular shape. In this respect, pairs of strips 92 are aligned lengthwise, and the pairs of aligned strips 92 are arranged side-by-side to form a generally rectangular shape, as best seen in FIG. 3. One end of each strip 92 is attached to mounting plate 74 at locations designated by "x" in FIG. 2 to define a fixed end 92a and a free end 92b. Strips 92 may be spot welded or riveted to mounting plate 74. The adjoining corners of free ends 92b of strips 92 have quarter round cutouts 94 that together define a circular opening 96. Circular opening 96 is dimensioned to be slightly larger in diameter than the diameter of the threaded rod forming mounting stud 32, but smaller than the outer diameter of conical nut 40. Strips 96 are disposed on mounting plate 74 such that circular opening 96 defined by free ends 92b of strips 92 is in registry with opening 76 through mounting plate 74. Opening 76 in mounting plate 74 is dimensioned to allow conical nut 40 on threaded stud 32 to pass therethrough. Strips 92 have a thickness that allow free ends 92b of strips 92 to flex or bend about a fixed ends 92a of strips 92.

Figure 5:
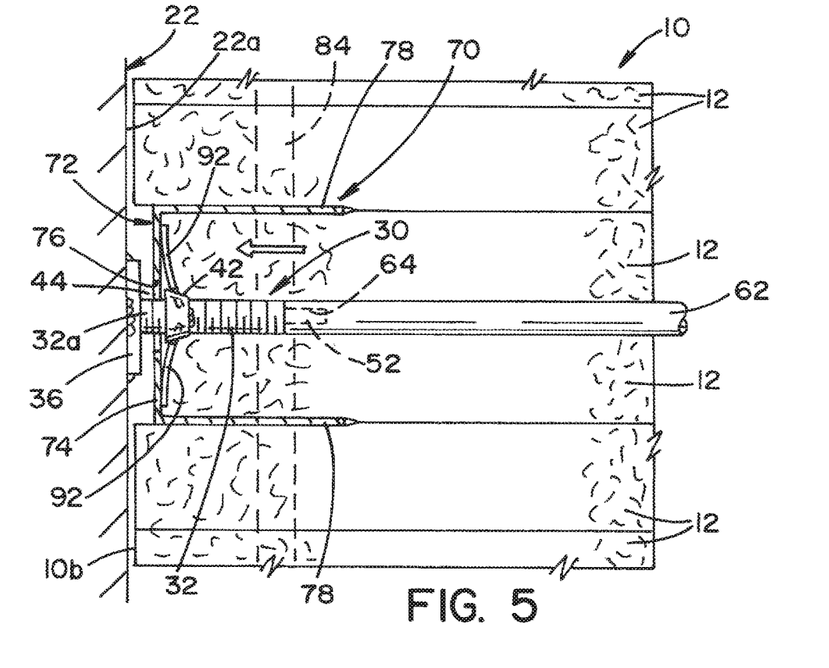
FIG. 5 is a top sectional view of the refractory module shown in FIG. 4 illustrating how resilient tabs on a mounting bracket flex as the ends thereof engage a conical surface on a mounting stud when the refractory module is forced onto the stud.
Figure 6:
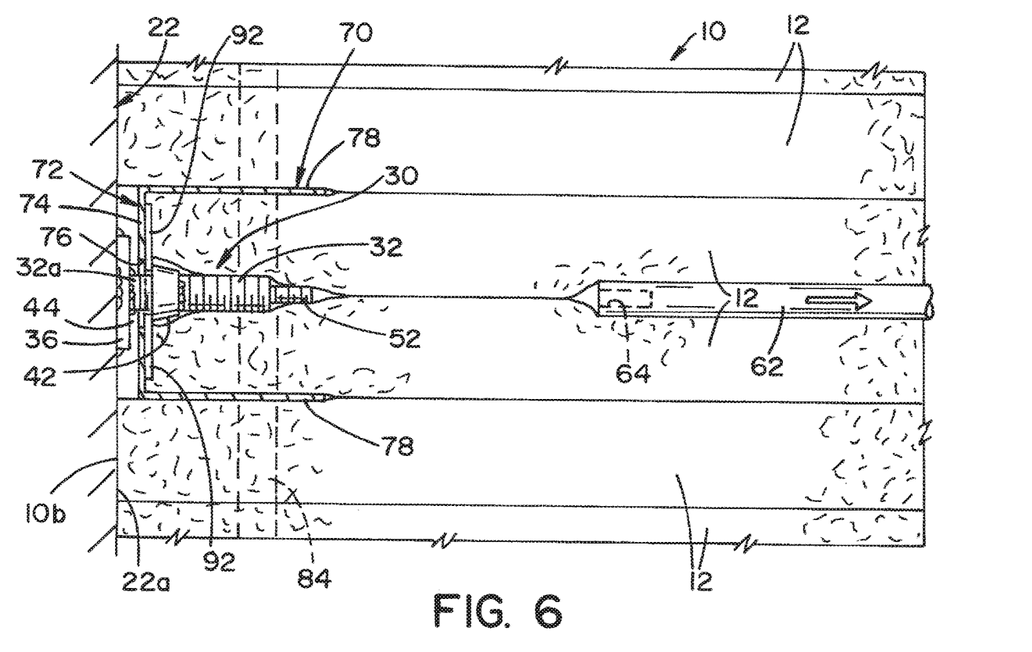
FIG. 6 is a top sectional view of a refractory module (partially shown) locked onto the mounting stud and a guide rod being withdrawn therefrom.
Figure 7:
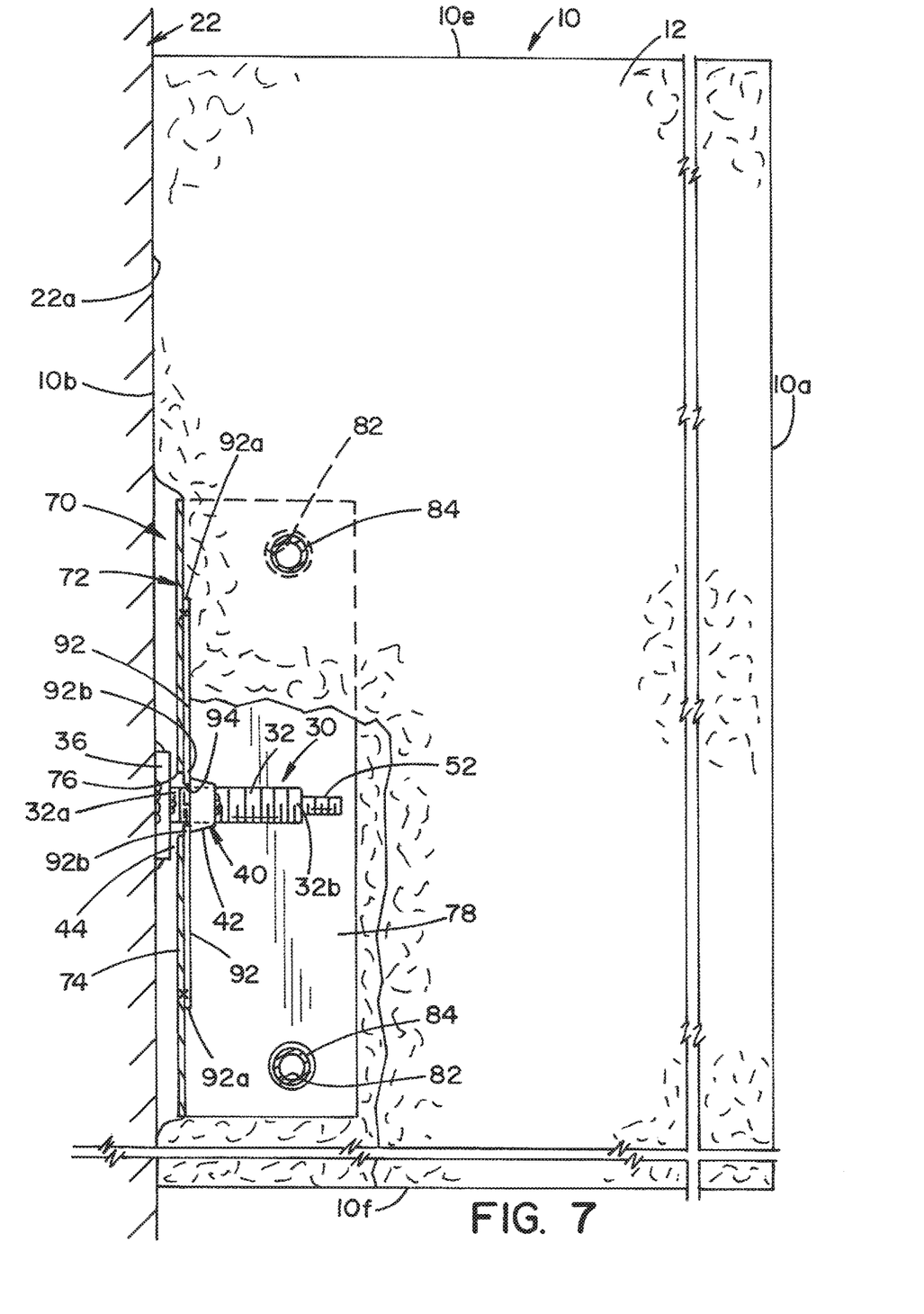
FIG. 7 is a side-sectional view the refractory module shown in FIG. 6.

Referring now to the operation of the invention, bracket assembly 70 is embedded within refractory module 10 with mounting plate 74 at or adjacent the cold face 10b of refractory module 10. In the embodiment shown, mounting plate 74 is slightly recessed from cold face 10b of refractory module 10 with side walls 78 of U-shaped bracket 72 extending into module 10, as best seen in FIGS. 4, 5 and 6.

Stud assembly 30 is mounted to inner surface 22a of refractory side wall 22 at a location where refractory module 10 is to be mounted to furnace wall 22. As will be appreciated, each module 10 requires a single stud assembly and therefore side-by-side refractory modules will require spaced-apart stud assemblies 30 along inner surface 22a of refractory side wall 22.

Guide rod 62 is mounted to threaded extension 52 on stud 32. Guide rod 62 is an elongated rod having an inner threaded bore 64 dimensioned to receive and threadingly mate with threaded extension 52 on stud 32. FIG. 4 shows guide rod 62 threaded onto a stud 32. Guide rod 62 has a length wherein guide rod 62 can extend through refractory module 10, as illustrated in FIG. 1.

With guide rod 62 mounted in place on stud 32, the free end of guide rod 62 is inserted in and through opening 76 in mounting plate 74 and through circular opening 96 defined by strips 92 that are attached to mounting plate 74. In this respect, the outer diameter of guide rod 62 is approximately equal to the outer diameter of stud 32 and therefore slides freely through bracket assembly 70. With bottom face 10f of refractory module 10 resting upon bottom wall 24 of a furnace (or on upper face(s) 10e of previously installed refractory modules 10), module 10 is then slid onto guide rod 62. As illustrated in FIG. 1, guide rod 62 slides easily between two adjacent layers 12 of refractory material that are captured between side walls 78 of mounting U-shaped bracket 72. As module 10 slides onto stud 32, free ends 92b of flexible strips 92 abut and slide onto conical surface 42 defined by conical nut 40. This engagement causes free ends 92b of strips 92 to flex backwards since the outer diameter of conical nut 40 is larger than circular opening 96 defined by strips 92. As module 10 is forced onto guide rod 62, flexed strips 92 eventually align with annular groove 44 wherein strips 92 snap into position, as best seen in FIG. 6, thereby locking refractory module 10 onto furnace side wall 22. Unthreading guide rod 62 from threaded extension 52 on the stud 32 allows guide rod 62 to be removed, as shown in FIG. 6, and allows layers 12 of refractory material to collapse towards each other. The present invention thus provides hardware for mounting refractory insulation module 10 to a furnace wall, which hardware enable quick and positive attachment of a refractory module 10 to furnace wall 22. Moreover, the hardware is disposed adjacent a cold face 10b of refractory module 10 and away from hot face 10a of refractory module 10.

Figure 8:
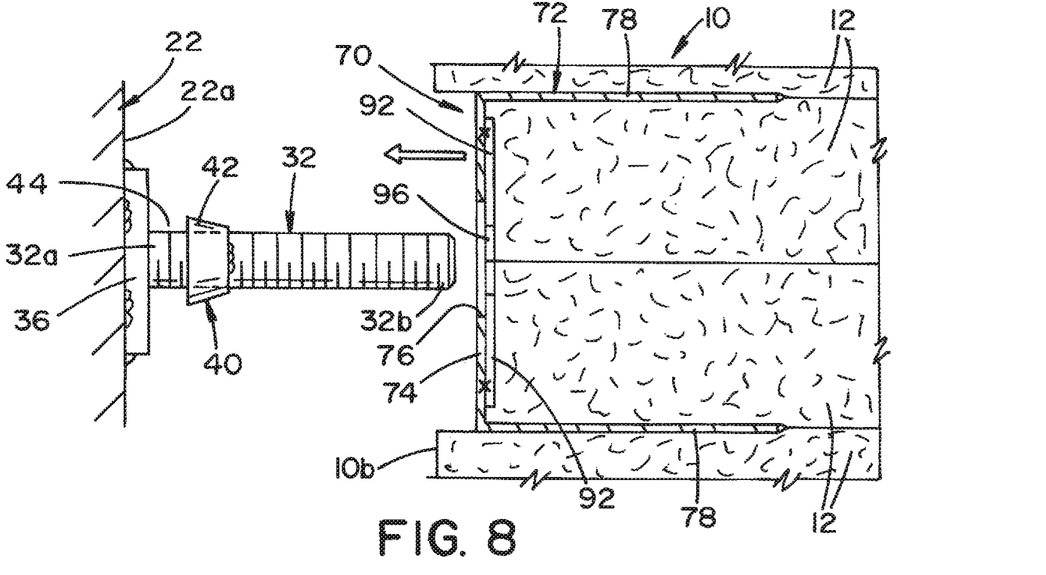
FIG. 8 is a top partially sectioned view showing a mounting bracket of a module being attached to a mounting stud without the use of a guide rod, illustrating an alternate embodiment of the present invention.
Figure 9:
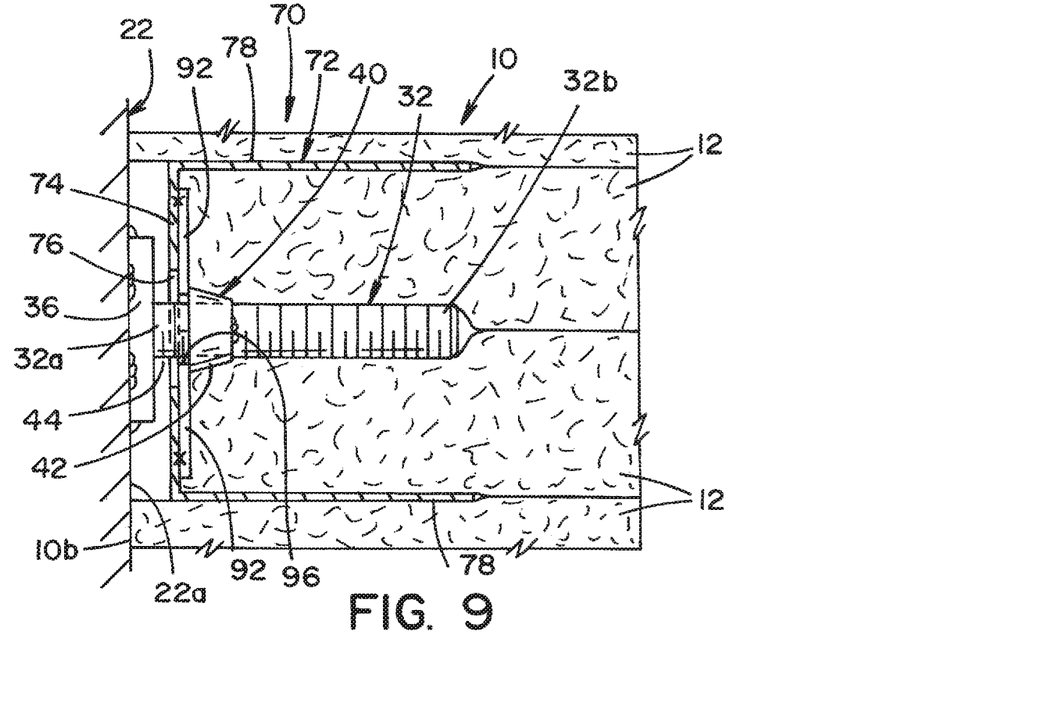
FIG. 9 is a top sectional view showing a refractory module (partially shown) in a mounted position secured onto a mounting stud.

Referring now to FIGS. 8 and 9, an alternate embodiment of the present invention is shown, wherein stud 32 does not include threaded extension 52 and refractory module 10 is inserted onto stud 32 without the use of guide rod 62. In this embodiment, when the position of module 10 relative to guide rod 62 is accurate, refractory module 10 can be merely forced onto stud 32. As with the embodiment shown in FIGS. 1-7, once flexible strips 92 on U-shaped bracket 72 slide over and past conical surface 42 defined by conical nut 40, strips 92 snap into annular groove 44, thereby locking refractory module 10 to furnace side wall 22.

Figure 10:
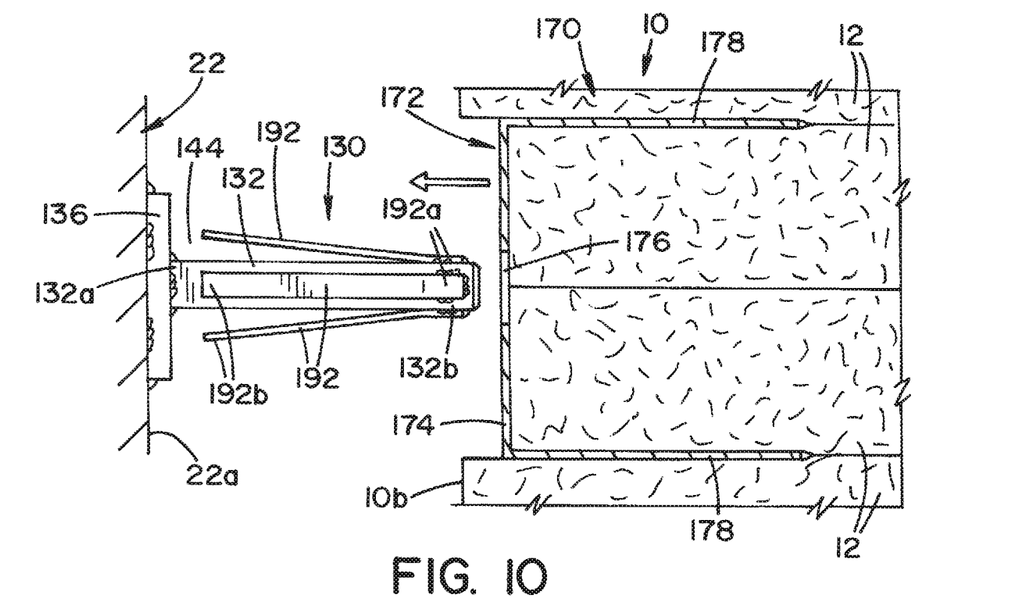
FIG. 10 is a top sectional view of a refractory module being mounted to the inner surface of a refractory wall illustrating the mounting hardware according to another embodiment of the present invention.
Figure 11:
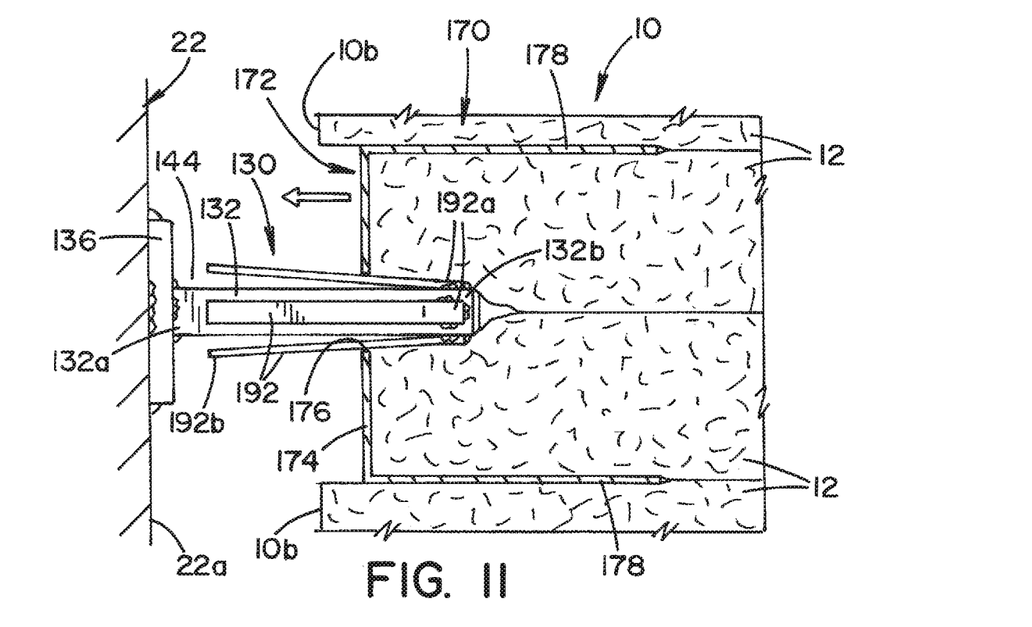
FIG. 11 is a top sectional view showing a mounting bracket in a refractory module (partially shown) being forced onto a mounting stem according to another embodiment of the present invention.
Figure 12:
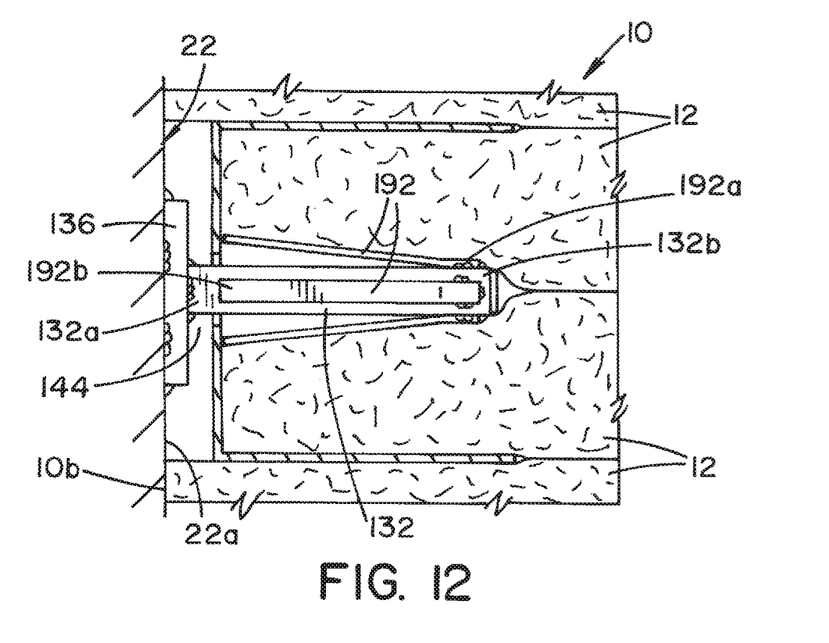
FIG. 12 is top sectional view of the refractory module and mounting bracket shown in FIG. 11, locked onto the mounting stud.

Referring now to FIGS. 10-12, another embodiment of the present invention is shown. In FIGS. 10-12, the mounting hardware is comprised of a stud assembly 130 and a bracket assembly 170. Stud assembly 130 is basically comprised of an elongated stud 132 attached to a base plate 136 that in turn is attached to inner surface 22a of furnace side wall 22. Stud 132 and base plate 136 are preferably formed of metal, and more preferably formed of steel and are welded together, as illustrated in the drawings.

In the embodiment shown, stud 132 has a square cross-section that defines four flat side surfaces. Attached to each side surface is an elongated metallic strip 192. One end of each strip 192 is attached, preferably by welding, to a free end 132b of stud 132. In this respect, each strip 192 that is attached to stud 132 has a fixed end 192a and a free end 192b. Each strip 192 is bent outwardly such that free end 192b of each strip is spaced from stud 132, as best seen in FIG. 10. Free ends 192b of strips 192 are spaced from base plate 136 to define an annular gap or space 144 therebetween. Strips 192 are dimensioned to be flexible, as shall be described in greater detail below.

Bracket assembly 170 is comprised of a U-shaped bracket 172, similar to the U-shaped bracket 72 described in the embodiment shown in FIGS. 1-7. Bracket assembly 170 includes support rods, not shown, for supporting layers 12 of module 10. U-shaped bracket 172 includes a mounting plate 174 having an opening 176 formed therein. Opening 176 is dimensioned to receive free end 132b of stud 132 therein. Opening 176 is dimensioned to be smaller than the spacing, i.e., the distance between the free ends of strips 192 on opposing surfaces of stud 132.

In this respect, wherein module 10 is forced onto stud 132, mounting plate 174 slides over strips 192 and thereby compress strips 192 as mounting plate 174 moves toward base plate 136. As mounting plate 174 moves past free ends 192b of strips 192, strips 192 return to their normal expanded configuration and snap outwardly against layers 12 of module 10, thereby locking and securing module 10 to furnace side wall 22 by maintaining mounting plate 174 within the annular gap or space defined between base plate 136 and free ends 192*b* of stud assembly 130.

Since mounting plate 174 of U-shaped bracket 172 is slightly recessed from the cold face of module 10, the slight compression of the layers of refractory material basically fixedly secures module 10 in place against surface 22*a*, as illustrated in FIG. 12.

In the embodiment shown in FIGS. 10-12, strips 192 could be attached to a stud having a circular cross-section or multiple strips could be attached to other prismatic cross-sections.

The present invention thus provides a quick and secure method of locking refractory modules to a furnace wall by means of mounting hardware that snap-locks the refractory module onto a stud that is secure to the furnace wall.

Figure 13:
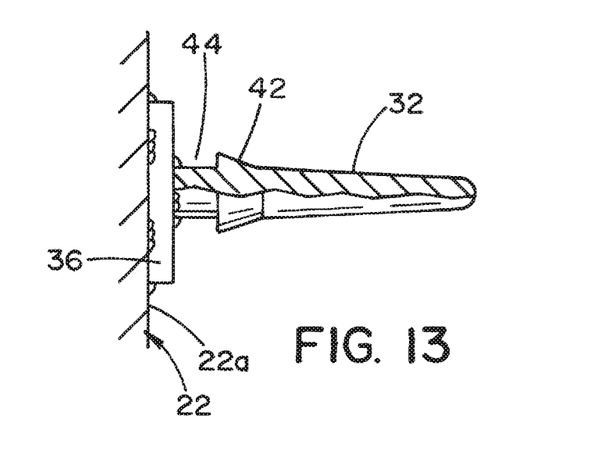
FIG. 13 is a partially-sectioned, side view of a mounting stud, illustrating an alternate embodiment of the present invention.

However, as will be appreciated, modifications and alterations to the disclosed embodiments are contemplated. For example, in the embodiment shown in FIGS. 1-7, the conical surface on stud 32 is formed by a conical member attached to stud 32. As will be appreciated by those skilled in the art, the stud and conical surface could be formed together with annular gap defined between the conical surface and the face plate. In other words, shank 32 and conical surface 42 could be machined from a single block of metal, without deviating from the present invention, as illustrated in FIG. 13.

Figure 14:
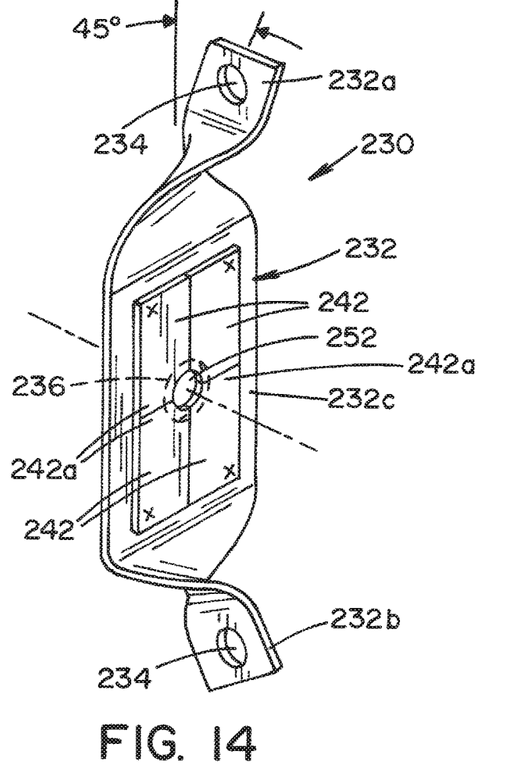
FIG. 14 is a perspective view of a mounting plate, illustrating another embodiment of the present invention.

Referring now to FIG. 14, a mounting plate 230 illustrates yet another embodiment of the present invention. Mounting plate 230 is generally comprised of a flat, rectangular, metallic plate 232, wherein end portions 232*a*, 232*b* of the plate are twisted 90° relative to the plane of a central portion 232*c* of the plate. End portions 232*a*, 232*b* are further bent to be at an angle relative to the plane of central portion 232*c* of mounting plate 232. In the embodiment shown, after being twisted 90° relative to the plane of central portion 232*c*, end portions 232*a*, 232*b* are bent about 45° relative to the plane of central portion 232*c*. Apertures 234 are formed through the end portions 232*a*, 232*b* to receive support rods (not shown in FIG. 14) for supporting layers 12 of refractory module 10, as described above. A central hole 236 (shown in dashed lines in FIG. 14) is formed through central portion 232*c* of mounting plate 232. Hole 236 is dimensioned to allow conical surface 42 of stud 32 to pass therethrough.

Flexible, metallic strips 242 (similar to strips 92 described above in FIGS. 1-7) are attached to central portion 232*c* of mounting plate 232, preferably by welding. An opening 252 is defined by free ends 242*a* of strips 242. Opening 252 is dimensioned to interact with conical surface 42 on stud 32 as described above to snap and lock a module 10 (in which mounting plate 230 is embedded) onto a furnace wall 22.

Figure 15:
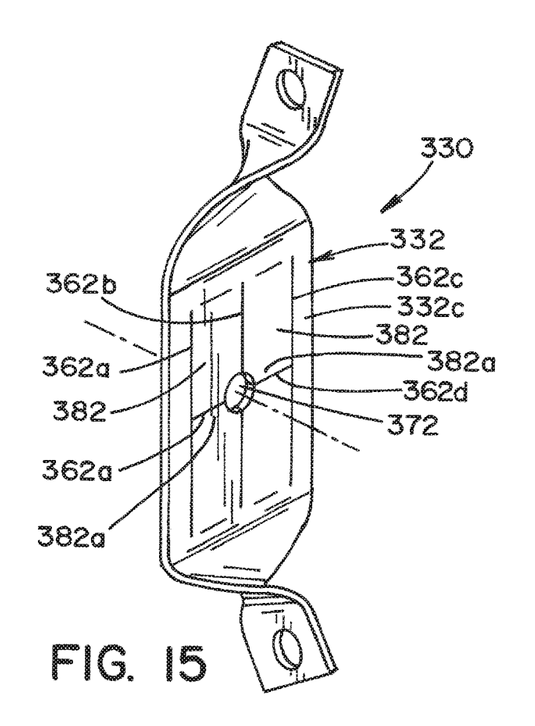
FIG. 15 is a perspective view of a mounting plate, illustrating yet another embodiment of the present invention.

FIG. 15 shows a mounting bracket 330, illustrating yet still another embodiment of the present invention. Mounting bracket 330 is similar to the mounting bracket 230 shown in FIG. 14, but in the embodiment shown in FIG. 15, flexible strips or tabs 342 are integrally formed as part of a planar central portion 332*c* of a plate 332 of mounting bracket 330. In the embodiment shown in FIG. 15, three (3) spaced-apart parallel slots 362*a*, 362*b*. 362*c* are cut lengthwise in central portion 332*c* of mounting bracket 330. A transverse slot 362*d* is cut through central portion 332*c* of mounting bracket 330. Slot 362*d* extends through aperture 372 and connects to outer slots 362*a*, 362*b* and 362*c*. In this respect, flexible strips or tabs 382 are formed by slots 362*a*, 362*b*, 362*c* and 362*d*. An aperture 372 is formed to bisect slot 362*b*. Aperture 372 is dimensioned to engage conical surface 42 of stud 32, as described above. As will be appreciated by those skilled in the art, free ends 382*a* of flexible tabs 382 interact with conical surface 42 on stud 32, to lock a refractory module 10 to a furnace wall 22, as described above. It will further be appreciated that slots, like those shown in FIG. 15, could also be cut in plate 74 of U-shaped bracket 72 shown in FIGS. 1-7, to obtain the same results.

It will be appreciated that the outer surface of stud 32 that expands outwardly may be other than conical in shape. The expanding outer surface of stud 32 may have an arcuate contoured shape or parabolic shape, or any other shape that expands outwardly in a direction from free end 32*b* to fixed end 32*a*, without deviating from the present invention.

It is intended that all such modifications and alterations fall within this scope of invention as claimed and equivalence thereof.

Having described the invention, the following is claimed:

1. Mounting hardware for mounting an insulation module on a furnace wall, said module being rectangular in shape and having a hot face for presentation to an interior of a furnace and a cold face for presentation to a surface of said furnace wall, a module thickness defined between said hot face and said cold face, a pair of side faces defining between them a module width and a top face and bottom face defining between them a module height, said hardware comprising:
   a mounting bracket embedded within said module, said bracket having a plurality of flexible tabs, each tab having a fixed end and a free end, said free ends of said tabs arranged about a central point and being movable (flexible) relative to said fixed ends, and
   a mounting stud having a fixed end attachable to an inner surface of a furnace wall and a free end, wherein said stud extends from said inner surface along an axis generally perpendicular to said inner surface, said stud having an annular groove adjacent said fixed end, said stud being dimensioned to extend through said mounting bracket between said free ends of said tabs and to cause said tabs to flex as said bracket moves along said stud from said free end towards said fixed end, wherein said tabs snap and lock into said annular groove when said bracket reaches said annular groove.

2. Mounting hardware as defined in claim 1, wherein said mounting bracket is generally U-shaped and has a bottom wall and opposing side walls extending therefrom, wherein said tabs are attached to said bottom wall.

3. Mounting hardware as defined in claim 2, wherein said tabs are rectangular, flexible plates that are fastened to said bottom wall.

4. Mounting hardware as defined in claim 3, wherein said plates are riveted to said bottom wall of said bracket.

5. Mounting hardware as defined in claim 4, wherein said mounting bracket and said plates are formed of steel and said plates are welded to said bracket.

6. Mounting hardware as defined in claim 1, wherein said tabs are rectangular in shape and are arranged wherein one corner of each plate has a corner adjacent corners of said other plates.

7. Mounting hardware as defined in claim 6, wherein said one corner of each is formed to have an arcuate notch and said adjoining corners form a circular opening.

8. Mounting hardware as defined in claim 1, wherein support beams extend from said side walls of said mounting bracket and extend through layers of insulation forming said module.

9. Mounting hardware as defined in claim 1, wherein said stud is comprised of a cylindrical rod having a conical surface thereon, said conical surface increasing in diameter in a direction from said free end of said stud to fixed end of said stud.

10. Mounting hardware as defined in claim 9, wherein said conical surface is defined by a conical nut on said stud.

11. Mounting hardware as defined in claim 9, wherein said cylindrical rod and said conical surface are integrally formed.

12. Mounting hardware as defined in claim 9, wherein said conical surface expands in a direction from said free end of said mounting stud to said fixed end of said mounting stud, and said annular groove is defined by one end of said conical surface.

13. Mounting hardware as defined in claim 1, wherein said flexible tabs are integrally formed in said mounting plate by slots therein.

14. Mounting hardware as defined in claim 1, wherein said mounting bracket is embedded within said insulation module at or near said cold face.

15. Mounting hardware as defined in claim 1, wherein said mounting bracket is a flat plate having a flat, central portion and opposing end portions bent 90° relative to said flat portion.

16. Mounting hardware for mounting an insulation module on a furnace wall, said hardware comprising:

a mounting bracket within said module, said bracket having a plurality of flexible tabs, each tab having a fixed end and a free end, said free ends of said tabs arranged about a central point and being movable relative to said fixed ends, and a mounting stud having a fixed end attachable to an inner surface of a furnace wall and a free end, wherein said stud extends from said inner surface, said stud having an annular groove between said fixed end and said free end, said stud being dimensioned to extend through said mounting bracket between said free ends of said tabs and to cause said tabs to flex as said bracket moves along said stud from said free end towards said fixed end, wherein said tabs snap and lock into said annular groove when said bracket reaches said annular groove.

17. Mounting hardware as defined in claim 16, wherein the outer surface of said stud expands outwardly in a direction from said free end to said fixed end.

18. Mounting hardware as defined in claim 17, wherein the outer surface of said stud that expands outwardly is a conical shape.

* * * * *